(12) United States Patent
Gomez

(10) Patent No.: US 8,170,918 B2
(45) Date of Patent: May 1, 2012

(54) METHOD AND INSTRUMENTS FOR SALE OF PERSONAL CARE PRODUCTS

(76) Inventor: Rounault Gomez, Brampton (CA)

( * ) Notice: Subject to any disclaimer, the term of this patent is extended or adjusted under 35 U.S.C. 154(b) by 596 days.

(21) Appl. No.: 12/149,701

(22) Filed: May 7, 2008

(65) Prior Publication Data

US 2008/0281728 A1   Nov. 13, 2008

Related U.S. Application Data

(60) Provisional application No. 60/916,633, filed on May 8, 2007.

(51) Int. Cl.
*G06Q 30/00* (2012.01)
*G06F 17/30* (2006.01)

(52) U.S. Cl. .............. 705/26.1; 705/27.1; 705/26.61; 705/26.64

(58) Field of Classification Search ........... 705/26–27
See application file for complete search history.

(56) References Cited

U.S. PATENT DOCUMENTS

| | | | |
|---|---|---|---|
| 5,478,238 A | 12/1995 | Gourtou et al. | |
| 5,537,211 A | 7/1996 | Dial | |
| 5,945,112 A * | 8/1999 | Flynn et al. | 424/401 |
| 6,437,866 B1 | 8/2002 | Flynn | |
| 6,603,550 B1 * | 8/2003 | Flynn et al. | 356/402 |
| 2002/0036778 A1 | 3/2002 | Wagner et al. | |
| 2003/0236694 A1 * | 12/2003 | Liu et al. | 705/9 |
| 2004/0117383 A1 * | 6/2004 | Lee et al. | 707/100 |
| 2007/0076013 A1 * | 4/2007 | Campbell et al. | 345/589 |
| 2007/0100555 A1 * | 5/2007 | Ladjevardi | 702/1 |
| 2007/0227934 A1 * | 10/2007 | Fracassi et al. | 206/581 |
| 2008/0311061 A1 * | 12/2008 | Heuer | 424/63 |

FOREIGN PATENT DOCUMENTS

| | | |
|---|---|---|
| CA | 2146134 | 2/1995 |
| CA | 2188656 | 11/1995 |
| CA | 2190656 | 11/1995 |
| WO | WO 00/16683 | 3/2000 |

OTHER PUBLICATIONS

Fonstad. 2003. "Understanding the roles of technology in improvising." Dissertations Abstracts International. vol. 6410A. [recovered from ProQuest on Mar. 6, 2012].*

* cited by examiner

*Primary Examiner* — William Allen
*Assistant Examiner* — Kathleen G Palavecino
(74) *Attorney, Agent, or Firm* — Kagan Binder PLLC

(57) ABSTRACT

Disclosed in this specification is a system for selecting a desired personal care product from a database of such products. The system scans the target application to determine the digital color value of the target. The resulting color value is converted into a standardized color value for comparison to a list of products with reference digital color values. A suggested product is found by searching the list for products whose reference color value closely matches the standardized color value obtained from the scan. The system is further capable of tracking customer data, sales history, and a variety of similar functions.

18 Claims, No Drawings

METHOD AND INSTRUMENTS FOR SALE OF
PERSONAL CARE PRODUCTS

CROSS-REFERENCE TO RELATED APPLICATIONS

This application claims priority to and the benefit of co-pending U.S. provisional patent application Ser. No. 60/916,633, filed May 8, 2007, which is hereby incorporated by reference in its entirety.

FIELD OF THE INVENTION

This invention relates, in one embodiment, to a system for selecting a desired personal care product, such as a cosmetic, from a database of such products. The target application site is scanned and a digital color value is determined. After standardizing the digital color value, a suggested product may be determined by comparing the color value of the target site to reference color values in a list of products.

BACKGROUND OF THE INVENTION

In the current cosmetic retail environment, the process of identifying and matching foundation, concealer and blush to skin tones is subjective and inconsistent.

This involves visually looking at the product or paper color charts and comparing it to the consumer's skin and/or utilizing used testers and brushes to apply different shades to the consumer. Likewise, when selecting a lipstick, eyeshadow or nail polish, it is difficult and time consuming to try products from a number of different manufacturers in order to find a match. Similarly, in the area of skin care, there are a number of skin conditions that consumers inquire about, yet there are hundreds of recommended manufacture remedies. It is therefore very difficult for a cosmetician to be aware of the uniqueness of each brand and to recommend a suitable product.

Currently, a consumer's experience is largely dependant upon the level of experience of the cosmetician on duty. Inexperienced part-time cosmeticians tend to work evenings when most consumers have time to do their personal shopping for cosmetics.

Lack of experience in cosmeticians results in poor consultation advice. Inconsistent advice from different cosmeticians results in low consumer trust in the retailer and its cosmetic department. Consumers must try different color matches by streaking their hand and/or faces in order to find a close match to their skin tone. There is limited cross-reference to other matching color products once the primary product is selected.

A significant amount of time is spent trying to match the consumer's skin tone to the different brands and colors available in a cosmetic department. The testing process involves testers and used brushes that can be unhygienic and time-consuming when it comes to selecting the right individual color shades. Uncertainty of having matched the wrong color or giving the wrong consulting advice is often present. This results in cosmeticians being afraid to up-sell other skin care products due to lack of individual product knowledge.

Consumers are unsure that the advice they receive is reliable depending on who is providing it. There is limited or no consumer history profiles of purchases to assist in selecting future goods. The same trial and error selection process has to be repeated for future color tone matching and skin conditions. Retail cosmetic locations are overwhelming with different brands, different colors within each brand, and different skin condition remedies. This creates confusion for the cosmetic consultant and consumer and results in consumers expending considerable time selecting cosmetics.

Future consumer interaction may be limited due to minimal profile tracking and there is a lack of personalized communications of new product launches. Consumers miss out on special pricing offers and purchasing opportunities as there is no easy way to follow up with consumers after the original sale.

Canadian Patent No. 2,188,656 is for a method and instrument for identifying categories of skin coloration for compatibility with colors of clothing, makeup, etc., and more particularly to methods and apparatus for classifying skin color based upon its blue and yellow undertones and for assigning one of a plurality of basic categories for which compatible colors have been selected. However, only blue and yellow undertones are analyzed which results in limited analysis of skin tone as the color analysis is performed using Hunter's L,a,b which are only blue and yellow undertones. In addition, this system does not result in the generation of a digitalized number that can be recognized by a computer. As computers use the RGB (3 color digital scale) as a means to identify and process color-related function, the Hunter L a,b is not compatible with the computer digital format of RGB.

Canadian Patent No. 2,146,134 is for a method and apparatus for determining the color of a foundation makeup. There is a need for determining color of various other types of cosmetic products as well, and also a need to track consumer's purchases to better manage inventory and for further promotion. It discloses measuring the visual skin tone of the inner and outer part of the individual's arm and comparing it to a palette of reference foundations covering a sample of the population. This is a manual and visual process which also does not utilize the RGB digital process.

There is a need for improved methods and apparatus for determining the skin tone of a consumer and matching it with a product. There is also a need for tracking consumer's needs and interests to enable retailers to better manage inventory as well as to manage promotions and marketing efforts.

SUMMARY OF THE INVENTION

The invention comprises, in one form thereof, a system for selecting a desired personal care product from a database of such products. The system scans the target application to determine the digital color value of the target. The resulting color value is converted into a standardized color value for comparison to a list of products with reference digital color values. A suggested product is found by searching the list for products whose reference color value closely matches the standardized color value obtained from the scan.

DETAILED DESCRIPTION OF A PREFERRED EMBODIMENT

The present invention provides a method and apparatuses for determining digital skin color and skin type conditions for matching with cosmetics, skin care products and other personal care goods. The present invention also provides a method for managing product and customer information for providing accurate consulting suggestions from cosmetician to consumer. The present invention offers consumers a clean and hygienic way for consumers to match their skin tone, eliminating the messy process of trying different testers.

The present invention uses a color scan device to assist in measuring skin tone of a consumer. An example of a suitable color scan device may be found in U.S. Patent Application No. 20020036778 which is sold under the trade-mark PocketSpec ColorQA Series ¾. The PocketSpec device digitally measures the color of a target color and then allows the user to sample any number of comparison colors to determine a color match. The Pocket Spec device is light-weight, portable, hand held and battery operated. Colors are read by pressing the tip against the surface of the color to be read and pushing the "read" button. The three color zones measured by the ColorQA Series ¾ are Red, Green and Blue (RGB). The Red, Green and Blue color zone value ranges from 0 to 255 and results in a digital representation of a color. A customer's digital skin tone is arrived at by using the RGB number, as described further below, in accordance with the invention wherein a skin tone number can be calculated.

The RGB number of various personal care products can also be determined by scanning product color charts or other product samples with the PocketSpec device to obtain the RGB number. The RGB number can then be used to obtain a skin tone number in accordance with an embodiment of the invention.

A color is a combination of Red, Green and Blue color zones. A digital representation of a color is a number known as RGB color. The RGB color is equal to Blue color zone multiple by 65536 plus Green color zone multiply by 256 plus Red color zone.

$$RGB = Red + (Green \times 256) + (Blue \times 65536)$$

The RGB generated by the Red, Green and Blue color zones from the ColorQA Series 4 device does not correspond to a skin tone color. In order to convert the ColorQA RGB colors to skin tone colors, a collection of RGB data was obtained for different samples and compared to known RGB skin tone colors. The equation is:

ColorQA $RBG$+Unknown=Skin Tone Color $R+a, G+b, B+c = R1, G1, B1$

R, G & B are the RGB color zone of the ColorQA Series 4 Device
a, b & c are the unknown variables
R1, G1 & B1 are the known Skin Tone Color Zone
Sample Table:

| R | a | G | b | B | c | R1 | G1 | B1 |
|---|---|---|---|---|---|----|----|----|
| 100 | 150 | 80 | 120 | 60 | 90 | 250 | 200 | 150 |
| 95 | 142 | 78 | 117 | 59 | 88 | 237 | 195 | 147 |

Process to derive at the formula:

| Unknown a | Unknown b | Unknown c |
|---|---|---|
| 100 + a1 = 250 | 80 + b1 = 200 | 60 + c1 = 150 |
| a1 = 250 − 100 | b1 = 200 − 80 | C1 = 150 − 60 |
| a1 = 150 | b1 = 120 | C1 = 90 |
| 95 + a2 = 237 | 78 + b2 = 195 | 59 + c2 = 147 |
| a2 = 237 − 95 | b2 = 195 − 78 | C2 = 147 − 59 |
| a2 = 142 | b2 = 117 | C2 = 88 |
| f1 = 100/250 | f1 = 80/200 | f1 = 60/150 |
| f1 = 0.4 | f1 = 0.4 | f1 = 0.4 |
| f2 = 95/237 | f2 = 78/195 | f2 = 59/147 |
| f2 = 0.4 | f2 = 0.4 | f2 = 0.4 |
| f1 = f2 | f1 = f2 | f1 = f2 |
| f = 0.4 | f = 0.4 | F = 0.4 |

Therefore the formula to convert ColorQA RGB color zone to skin tone color is:

Skin Tone Color=(Red/0.4)+((Green/0.4)*256)+((Blue/0.4)*65536)

or

ColorQA Red/0.4,ColorQA Green/0.4,ColorQA Blue/0.4=Skin Tone Red,Skin Tone Green,Skin Tone Blue The RGB readings from the ColorQA device are compared to the collection of cosmetic colors in RGB format: The absolute value of the difference of the Red color zone of the ColorQA device and the cosmetic color plus the absolute value of the difference of the Green color zone of the ColorQA device and the cosmetic color plus the absolute value of the difference of the Blue color zone of the ColorQA device and the cosmetic color divided by the sum of the ColorQA color zone (Red+Green+Blue).
The formula is $$\frac{\text{Abs}(R1 - R2) + \text{Abs}(G1 - G2) + \text{Abs}(B1 - B2)}{R1 + G1 + B1} \times 100\%$$

R1, G1 and B1 are the readings from the ColorQA device
R2, G2 and B2 are the cosmetic color zones The system is able to take the number generated by the Color QA device and convert to a new value using the above analysis to identify the actual skin tone number. This new number is then used to search and match all color shades that are equal or are close to (as a percentage value) the new number with 0% being the identical color.

It is expressly understood that other calibrated color scan devices can also be employed so long as they generate a digital value for skin color which can be matched with a database of cosmetic colors. Other Color Scan Device manufacturers will have a different Rd,Gd,Bd value but will be in the vicinity of approximately 0.4 (the common denominator of readings from the PocketSpec device and the skin samples tested). In particular, by comparing the RGB readings to multiple human skin tones (by finding the actual skin tones for the same readings and determining the variance between the reading on the Color Scan Device and the actual skin tone match), it was determined that the variance is approximately 0.4. The 0.4 variance is the difference between the cosmetic color tones and individual PocketSpec readings.

As described above, a database of cosmetic products is created that each have a digital color number assigned for searching purposes. The present invention cross-references against a library of manufactured brand products to harmonize with the closest skin color match to the selected brand or price point selected.

A suitable central processing unit such as a microprocessor or other central processing unit such as a personal computer is used to perform the color analysis together with the usual Computer BIOS (which will vary with computer manufacturer), a computer operating system such as Windows by Microsoft Corporation, Windows XP, a software program such as Microsoft Access by Microsoft Corporation and the software according to an embodiment of the invention.

In one embodiment of the present invention, a touch screen computer is used to interface with the software system to select various products. In addition, a printer can be employed which will print out recommended products based on the digital number that is input into the system.

In operation, a new customer's personal data in entered (such as name, age, SPF, phone number, address and any other personal preferences or observations). The cosmetician uses the PocketScan to read the individual's numeric skin color (which is entered into the software). The software of the invention converts the RGB color set as described above to generate a new set of RGB colors that is in line with the natural human skin tone. The system stores the color for future references. The cosmetician is able to enter fields on the screen such as Product Type, Product Brand, Manufacture, Price point, Age, Skin Type, Sun Screen SPF, Texture, Day or Night etc. The customer then proceeds to request the item they require such as foundation, concealer etc. The system is able to provide a recommendation that closely matches the customer's request. It also displays a predetermined number of other products that are within a certain range by percentage to the brand the customer originally requested to make sure they still want the original brand they asked for. In a preferred embodiment, each product found also displays a percentage (%) difference between the product found and the customer's actual skin tone color on their profile.

If a match is not found under the customer's preferred criteria, a general search is done using basic skin tone criteria. In the event of a skin condition request, the product match provides the matching product features and benefits for consultation purposes as well as active ingredients that help explain how it will address the ailment. Once the customer has made their final selection, the system will also provide a list of other matching cross sell items. These cross sell items can be printed on a hardcopy through the printer. This can be used by the cosmetician as a reference guide to help find the other cross sell items in the department.

Once the selected items are confirmed, they are entered as accepted on the screen and the software will remember each purchase for future profile reference. The items purchased can also be stored for other data tracking purposes.

In the case where the customer is looking for a lipstick, nail polish or other product not related to skin tone, the system is able to display main natural colors on the screen (red, blue, green, pink, brown etc). Once the natural color that closely matches the customer's needs is selected, secondary color spectrums of all sub-colors are again displayed on the screen. The sub-colors are displayed with numbers or product names for easy location in the applicable cosmetic section.

In the case of an existing profiled customer, the cosmetician may ask for the name, phone number or loyalty card number for easy scanning. The name search will provide a list of closely related names. Once the customer is selected, the full profile is displayed with purchase history. The search for their purchase requirements can now proceed similar to a new customer process without the step of entering personal data or finding their skin tone match.

An embodiment of the present invention provides a color spectrum of each cosmetic by a specific color swatch that enables one to identify the consumer's color preferences. The color swatches can include any colors such as brown, green, yellow, purple and so on. The colors are then broken down into sub-shades for easy matching by the customer. The selected product may then be cross-matched with other similar cosmetic color products for providing the consumer with a color match. This cross-matching with other products increases the chance of incremental sales opportunities for the retailer. The software may contain suppliers' product information such as features and benefits of various products which can be accessed, via a keyboard or touch screen, by the customer or cosmetician.

As a data storage device, the present invention stores consumer profiles for future color matching sales reference, target marketing, as well as purchase history for easy repeat sales. The store's sales history by product, consumer, and sales staff provides an opportunity to generate numerous management reports for analyzing cosmetic sales and all of the components associated with it. The information in the data storage device can be sorted to generate business reports.

For example, the software is able to capture the actual skin tone match by supplier, which the scanner has identified as a match; select color-matches based upon consumer preferred price range or product brand; store consumers mailing address; store consumers personal data, for example, family, life-style, or personal preferences; store past purchase history of consumers, for example, date, brand, color and price; store consultation advice such as tips and tricks for the cosmetician to share with consumer; monitor the date of purchase for expiration alert purposes; provide field(s) for cosmeticians to input comments and notes; provide fields for managers to input work duties or other business instructions to staff; store appointments and bookings for in-store events; provide suggestions for consumers' skin care and cosmetic products based on a consumer profile; and provide suggestions for consumer products matching colors for incremental cross sell opportunities.

The software is able to generate reports by consumer brand preference, which may be used for targeting mailing on new launches or product promotion, as well as mailing labels and pre-printed program letters for easy mailing and mail merging.

The software is able to generate and sort sales reports by brand by consumer, reports by volume by consumer; reports by sales representatives by shift by dollars; reports by total commissionable sales by sales representatives targeting incremental sales; reports for total incremental sales that were generated after original purchase (up-sell); provide a computerized schedule tool that allows for easy to print schedules for each employee to print out; generate demographics reports; generate schedule shifts for employees; generate daily duty reports for staff and/or manager; generate notification reminders to communicate with different shifts; generate head office directives to be communicated to all staff members; provide updates on new product launches and promotional offers; provide new training ideas or concepts; and track sales results after a specific product brand promotion or discount.

Not being limited to skin matching, the present invention can also provide skin care condition recommendations based on the parameters inputted (such as acne, dry skin, etc.). The software can also select specific products that match the consumer's needs as well as a suggested complementing regime of other supporting products for sales and consultation purposes.

The above specified preferred embodiments of the invention are illustrative and may be modified as will be readily understood by those skilled in the art without departure from the spirit and scope of the invention.

What is claimed is:

1. A process for determining a desired personal care product comprising the steps of:

determining by an optical scanner digital red, green, and blue (RGB) color zones ($R_0$, $G_0$, $B_0$) of a target application site on a human being, converting by a processor the digital RGB color zones ($R_0$, $G_0$, $B_0$) into a standardized digital RGB color value ($R_1$, $G_1$, $B1$) according to the following formula:

$$R_1, G_1, B_1 = \left(\frac{R_0}{0.4}\right) + \left(\left(\frac{G_0}{0.4}\right) \times 256\right) + \left(\left(\frac{B_0}{0.4}\right) \times 65536\right),$$

examining by a processor a list of personal care products that has a reference digital RGB color value for each such personal care product, and comparing by a processor the standardized digital RGB color value of the target application site to the reference digital RGB color value for the personal care products which correspond to the target application site.

2. The process as recited in claim 1, wherein the target application site is facial skin.

3. The process as recited in claim 2, further comprising the step of determining by a processor the difference between the reference digital RGB color values and the standardized digital RGB color value.

4. The process as recited in claim 3, further comprising the step of presenting to a customer the personal care product with the smallest difference, wherein the presented personal care product is selected from the list of personal care products.

5. The process as recited in claim 4, further comprising the step of presenting to a customer the personal care product with the second smallest difference, wherein the presented personal care product is selected from the list of personal care products.

6. The process as recited in claim 1, wherein the step of determining by the optical scanner the digital RGB color value of the target application site is performed by scanning the target application site.

7. The process as recited in claim 1, wherein the list of personal care products is stored in a database that correlates the personal care products to the reference digital RGB color value and to a product type.

8. A program storage device readable by machine, tangibly embodying a program of instructions executable by machine to perform the method steps for determining a desired personal care product comprising the steps of:

determining digital red, green, and, blue (RGB) color zones ($R_0$, $G_0$, $B_0$) of a target application site on a human being, converting the digital RGB color zones ($R_0$, $G_0$, $B_0$) into a standardized digital RGB color value ($R_1$, $G_1$, $B_1$) according to the following formula:

$$R_1, G_1, B_1 = \left(\frac{R_0}{0.4}\right) + \left(\left(\frac{G_0}{0.4}\right) \times 256\right) + \left(\left(\frac{B_0}{0.4}\right) \times 65536\right),$$

examining a list of personal care products that has a reference digital RGB color value for each such personal care product, and comparing the standardized digital RGB color value of the target application site to the reference digital RGB color value for the personal care products which correspond to the target application site.

9. The program storage device as recited in claim 8, further comprising the steps of:

determining the difference between the reference digital RGB color values the standardized digital RGB color value, and presenting to a customer the personal care product with the smallest difference, wherein the presented personal care product is selected from the list of personal care products.

10. The program storage device as recited in claim 9, further comprising the step of entering the customer's personal data into a customer database.

11. The program storage device as recited in claim 10, wherein the personal data entered into the customer database includes a history of customer purchases.

12. The program storage device as recited in claim 10, further comprising the step of retrieving the customer's personal data from the customer database.

13. The program storage device as recited in claim 9, further comprising the step of grouping the personal care products by color and presenting the resulting groups to the customer.

14. The program storage device as recited in claim 9, further comprising the step of searching a cross-selling database for the presented personal care product, wherein the cross-selling database correlates the selected personal care product to a list of cross-selling products.

15. The program storage device as recited in claim 14, further comprising the step of presenting the resulting list of cross-selling products to the customer.

16. A cosmetic selection device comprising:

means for determining digital red, green, and blue (RGB) color zones ($R_0$, $G_0$, $B_0$) of a target application site on a human being, means for converting the digital RGB color zones ($R_0$, $G_0$, $B_0$) into a standardized digital RGB color value ($R_1$, $G_1$, $B_1$) according to the following formula:

$$R_1, G_1, B_1 = \left(\frac{R_0}{0.4}\right) + \left(\left(\frac{G_0}{0.4}\right) \times 256\right) + \left(\left(\frac{B_0}{0.4}\right) \times 65536\right),$$

means for examining a list of personal care products that has a reference digital RGB color value for each such personal care product, and means for comparing the standardized digital RGB color value of the target application site to the reference digital RGB color value for the personal care products which correspond to the target application site, means for determining the difference between the reference digital RGB color values and the standardized digital RGB color value, means for presenting to a customer the personal care product with the smallest difference, wherein the presented personal care product is selected from the list of personal care products.

17. The device as recited in claim 16, further comprising means for recording a sale.

18. The device as recited in claim 17, further comprising means for generating a sales report.

* * * * *